S. C. HICKMAN.
PULLING JACK FOR MOTOR VEHICLES.
APPLICATION FILED MAY 15, 1916.
1,228,918.
Patented June 5, 1917.
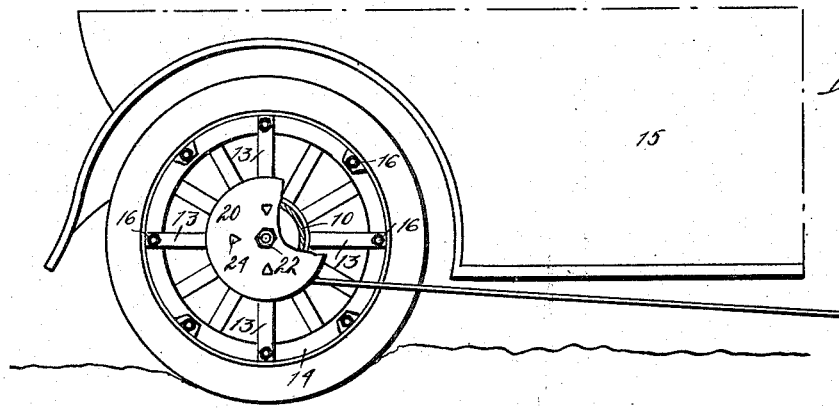
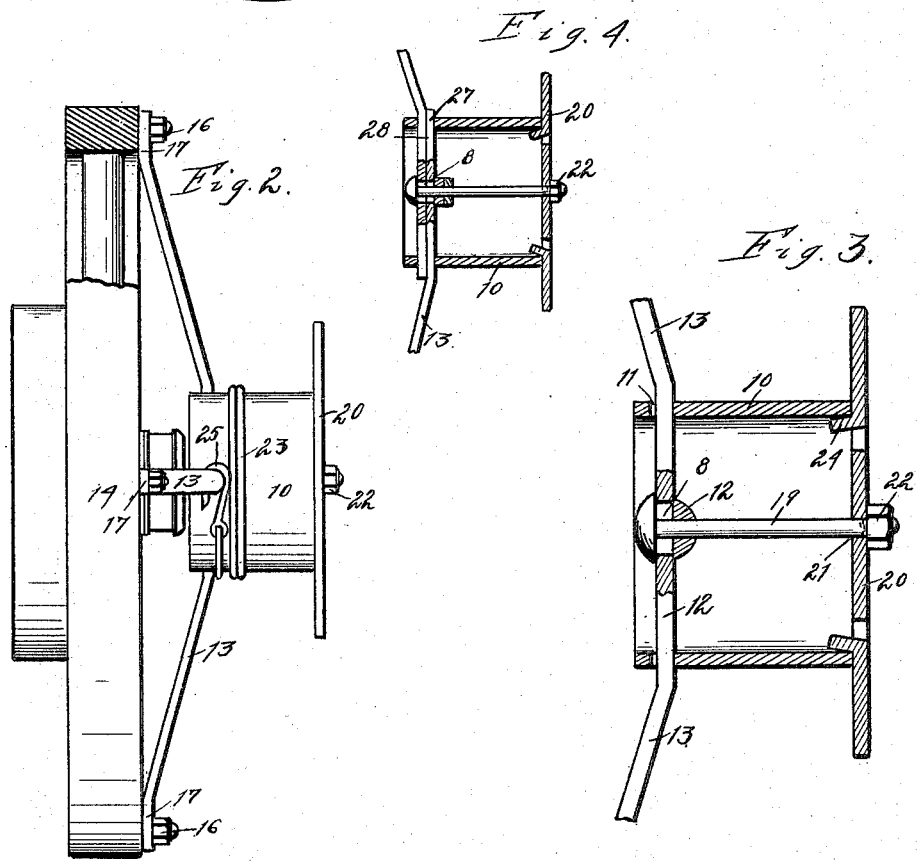

UNITED STATES PATENT OFFICE.

STEPHEN C. HICKMAN, OF CHARITON, IOWA.

PULLING-JACK FOR MOTOR-VEHICLES.

1,228,918.   Specification of Letters Patent.   Patented June 5, 1917.

Application filed May 15, 1916. Serial No. 97,753.

*To all whom it may concern:*

Be it known that I, STEPHEN C. HICKMAN, a citizen of the United States, and resident of Chariton, in the county of Lucas and State of Iowa, have invented a certain new and useful Pulling-Jack for Motor-Vehicles, of which the following is a specification.

The object of my invention is to provide a pulling jack of comparatively simple, durable and inexpensive construction, adapted to be mounted on a motor vehicle in such a way that a flexible device may be properly secured and connected with the jack and the power of the vehicle may be employed for pulling the vehicle out of the mud, the ditch or the like.

A further object is to provide such a jack capable of being taken apart so that the parts may be stored and transported in a comparatively small space.

A further object is to provide such a device so arranged that it can be readily and easily mounted on or removed from the traction wheel of a motor vehicle at a point spaced outwardly from the hub thereof, and may be rigidly supported.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a side elevation of a portion of a motor vehicle equipped with a jack embodying my invention.

Fig. 2 shows a rear elevation of the wheel.

Fig. 3 shows a vertical, transverse sectional view through the drum, and

Fig. 4 shows a view similar to that of Fig. 3 of a slightly modified form of my device.

It is my purpose to provide such a device so constructed and having drums so arranged that one drum may be mounted on each rear wheel of an automobile or the like, and a cable can be wound on the drum and secured to a stake or other stationary object in front or rearwardly of the automobile, so that when the wheels of the automobile are turned under the power of the engine, the flexible devices can be wound on the drums for pulling the automobile out of the mud or the like.

In this connection it may be mentioned that the stakes and flexible devices may be arranged in a manner similar to that shown in my copending application for patent Serial Number 82,623, filed March 7, 1916.

In each case my improved drum comprises a hollow cylinder which I have shown in the drawings herewith illustrating this form of my invention, and indicated by the reference character 10. The cylinder 10 near one end is provided with two pairs of openings 11. The openings of each pair are arranged diametrically opposite each other, and the members of one pair are a little farther from the end of the cylinder than the members of the other pair.

Extended through each pair of openings is a bar 12 preferably in the form of a half circle, the curved surface of the bar 12 being outward.

At each end of each bar 12 is an extension 13 inclined away from the drum 10 and toward the rim of the wheel 14 of the motor vehicle 15.

It is well known that with many pleasure automobiles of modern type, the demountable rim is secured in position by means of bolts 16. The extensions 13 are provided at their outer ends with short portions 17 designed to fit against the side of the rim of the wheel and provided with suitable openings to receive the bolts 16, whereby the ends 17 may be firmly and rigidly secured to the wheel.

It will, of course, be understood that where the device is used with a wheel that does not have demountable rims and bolts 16, holes may be cut in the rim to receive bolts 16.

The openings 11 of one pair are arranged a quarter way around the cylinder from the respective openings of the other pair, and it will be seen that when the bars 12 are installed, their centers cross in the middle of the cylinder. The bars 12 are provided at their central parts with suitable openings 18 to receive a bolt 19 extended longitudinally through the cylinder.

At the end of the cylinder 10 opposite the end near which the openings 11 are located, is a disk 20 having a central opening 21 to receive the bolt 19 on which is a nut 22 by which the disk 20 is held against the end of the cylinder 10. The disk 20 is of larger diameter than the cylinder 10 so that its outer portion forms a retaining member whereby the flexible device 23 when wound on the drum 10, will be held thereon. The disk 20 is preferably provided with a plurality of tongues 24 punched from the disk and extending inwardly, adapted to engage the inner surface of the end of the cylinder 10 for coöperating with the bolt 19 in holding the disk 20 properly centered.

In the practical use of my improved pulling jack one of the drums 10 is mounted on each rear wheel of the motor vehicle, and a flexible device 23 is provided with a hook 25 which is hooked over one of the extensions 13. The flexible device may then be given a turn or two around the drum and then extended forwardly or rearwardly, if desired, and secured to some stationary object.

It will be seen that when the engine is started and the rear wheels are thrown into gear, that tremendous power will be exerted as the wheels are rotated, for winding the flexible device 23 on the drum 10 and thereby drawing the motor vehicle toward the stationary object.

The drum may be very quickly and easily applied to or removed from the vehicle. When it is desired to remove it from the vehicle the nuts on the bolts 16 are removed. By removing the nuts the entire pulling jack on one side of the vehicle may be removed therefrom. By removing the nut 22 from the bolt 19 the bolt 19 may be withdrawn from the arms 12 and the disk 20, whereupon the disk 20 can be placed under the seat or elsewhere, as desired, and the arms 12 can be withdrawn from the drum 10 and the drum 10 can be placed in the tool box, under the seat, or elsewhere. The arms 13 can also be carried in a convenient way.

It will be seen that no tools are necessary in assembling or removing my improved pulling jack except a wrench, and that where demountable rims are used the ordinary parts of the wheel are not in any way interfered with.

The arrangement of the inclined arms 24 is such that the drum is spaced away from the hub of the wheel a sufficient distance so that the flexible device is carried straight forwardly when fastened, to clear the running board of the motor vehicle, and will not in any way interfere with or mar the parts of the vehicle.

In Fig. 4 I have shown a slightly modified form of my invention, in which instead of using the two arms 12 with the extensions thereof, I have used as a substitute for the arm 12 and extensions thereof a pair of arms 27 and 28 extended through the drum 10 and overlapping each other, each of said arms 28 having an extension 13 at one end similar to those already described. It will be seen that the arms 13 form a retaining means for the flexible device 13, whereby the device is held on the drum. The disk 20 serves as a retaining means and also serves to reinforce and make the drum rigid.

The details of the construction and arrangement of the parts of my improved device may be somewhat modified without departing from the essential features and purposes of my invention, and it is my intention to cover by my present application any such differences or modifications of structure as may be reasonably included within the scope of my claims.

I claim as my invention:

1. In a device of the class described, a hollow cylindrical member having slots in its walls, a plurality of bars, each extended through the wall of said cylindrical member at two points thereof, means for securing the outer ends of said bars to portions of a vehicle wheel, and means for preventing movement of said bars with relation to said cylindrical member whereby when the parts are assembled and mounted on the wheel, the cylindrical member is rigidly supported on said bars adjacent to said wheel with said cylindrical member concentric with said wheel.

2. In a device of the class described, a hollow cylindrical member having slots in its walls, a plurality of bars, each extended through the wall of said cylindrical member at two points thereof, means for securing the outer ends of said bars to portions of a vehicle wheel, and means for preventing movement of said bars with relation to said cylindrical member whereby when the parts are assembled and mounted on the wheel, the cylindrical member is rigidly supported on said bars adjacent to said wheel with said cylindrical member concentric with said wheel, a flexible device wound on said cylindrical member.

Des Moines, Iowa, May 2, 1916.

STEPHEN C. HICKMAN.

Copies of this patent may be obtained for five cents each, by addressing the "Commissioner of Patents, Washington, D. C."